(12) United States Patent  
Kubota

(10) Patent No.: US 9,398,593 B2  
(45) Date of Patent: Jul. 19, 2016

(54) RADIO BASE STATION, SCHEDULING SYSTEM, ALLOCATION CONTROL METHOD AND RECORDING MEDIUM

(75) Inventor: Mitsuhiro Kubota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 187 days.

(21) Appl. No.: 13/120,627

(22) PCT Filed: Sep. 9, 2009

(86) PCT No.: PCT/JP2009/065722  
§ 371 (c)(1),  
(2), (4) Date: Mar. 23, 2011

(87) PCT Pub. No.: WO2010/038590  
PCT Pub. Date: Apr. 8, 2010

(65) Prior Publication Data  
US 2011/0176450 A1    Jul. 21, 2011

(30) Foreign Application Priority Data

Oct. 2, 2008 (JP) ................. 2008-257396

(51) Int. Cl.  
*H04W 4/00* (2009.01)  
*H04W 72/04* (2009.01)  
*H04W 72/08* (2009.01)  
*H04W 72/12* (2009.01)

(52) U.S. Cl.  
CPC ........ *H04W 72/0486* (2013.01); *H04W 72/085* (2013.01); *H04W 72/1252* (2013.01)

(58) Field of Classification Search  
None  
See application file for complete search history.

(56) References Cited

U.S. PATENT DOCUMENTS

| 8,169,928 B2 * | 5/2012 | Iwamura et al. ............... 370/252 |
| 2005/0271002 A1 * | 12/2005 | Abe et al. ....................... 370/328 |
| 2006/0034438 A1 * | 2/2006 | O'Neill ..................... 379/114.07 |
| 2006/0036520 A1 * | 2/2006 | O'Neill ............................ 705/34 |
| 2006/0285522 A1 * | 12/2006 | Kim et al. ...................... 370/331 |
| 2007/0115915 A1 * | 5/2007 | Sheng et al. .................. 370/350 |
| 2008/0068999 A1 * | 3/2008 | Ishii et al. ..................... 370/235 |
| 2008/0144552 A1 * | 6/2008 | Johansson et al. ............ 370/310 |
| 2008/0151751 A1 * | 6/2008 | Ponnuswamy et al. ....... 370/232 |
| 2009/0003274 A1 * | 1/2009 | Kwak ................. H04W 72/042 370/329 |
| 2010/0284278 A1 * | 11/2010 | Alanara ........................ 370/235 |

(Continued)

FOREIGN PATENT DOCUMENTS

| CN | 1866783 A | 11/2006 |
| JP | 2002165260 A | 6/2002 |

(Continued)

OTHER PUBLICATIONS

International Search Report for PCT/JP2009/065722 mailed Oct. 27, 2009.

(Continued)

*Primary Examiner* — Anh-Vu Ly

(57) ABSTRACT

A radio base station that can communicate with a management device for controlling a mobile terminal and that accommodates the mobile terminal, includes: reception means for receiving an adjustment value in conformity with the amount of data which the mobile terminal has transmitted/received within a predetermined period, form the management device; and allocation means for controlling radio resources to be allocated to the mobile terminal, based on the adjustment value received by the reception means when the predetermined operational conditions are satisfied.

4 Claims, 10 Drawing Sheets

(56) References Cited

U.S. PATENT DOCUMENTS

| | | | |
|---|---|---|---|
| 2012/0069809 A1* | 3/2012 | Aminaka et al. | 370/329 |
| 2014/0181300 A1* | 6/2014 | Fadell | 709/224 |

FOREIGN PATENT DOCUMENTS

| | | | |
|---|---|---|---|
| JP | 2004153778 A | 5/2004 |
| JP | 2004312190 A | 11/2004 |
| JP | 2006094374 A | 4/2006 |
| JP | 2006352884 A | 12/2006 |
| JP | 2007180863 A | 7/2007 |
| JP | 2007274372 A | 10/2007 |
| JP | 2007281553 A | 10/2007 |

OTHER PUBLICATIONS

Japanese Office Action for JP2010-514415 mailed on May 22, 2012.

Takki Yu, et al., Proposal for Full Duplex Relay, IEEE 802.16 Broadband Wireless Access Working Group, US IEEE May 8, 2008 IEEE C802.16j-08/016r4, pp. 1-10.

Zhifeng Tao, et. al., Frame Structure Design for IEEE 802.16j Mobile Multihop Relay (MMR) Networks, IEEE Global Telecommunications Conference, 2007. GLOBECOM '07. US IEEE, 2007/1126, pp. 4301-4306.

Hang Zhang. et al., Frame Structure to Support Relay Node Operations, IEEE 802.16 Broadband Wireless Access Working Group Contribution, US IEEE, Jan. 8, 2007, IEEE C802.16j-07/100, pp. 0-12.

Office action provided in counterpart Chinese patent application 200980138969.2, dated May 6, 2013.

* cited by examiner

RADIO BASE STATION, SCHEDULING SYSTEM, ALLOCATION CONTROL METHOD AND RECORDING MEDIUM

This application is the National Phase of PCT/JP2009/065722, filed Sep. 9, 2009, which claims priority based on Japanese Patent Application 2008-254396 filed on Oct. 2, 2008, and should incorporate all the disclosure thereof herein.

TECHNICAL FIELD

The present invention relates to a radio base station, scheduling system, allocation control method and recording medium.

BACKGROUND ART

In LTE (Long Term Evolution) that is used as the next-generation mobile communication specification, the uplink radio access scheme adopts SC-FDMA (Single Carrier-Frequency Division Multiple Access) while the downlink radio access scheme employs OFDMA (Orthogonal Frequency Division Multiple Access).

OFDMA is a digital modulation and demodulation scheme in which a plurality of carrier waves (called sub-carriers) are multiplexed using orthogonality between frequencies. Accordingly, OFDMA is said to have robust resistance to fading and multi-path interference.

On the other hand, the characteristic of SC-FDMA is similar to OFDMA. The different point of SC-FDMA from OFDMA is that sub-carriers allocated to the users are continuous. Accordingly, SC-FDMA is expected to be enhanced in power efficiency compared to OFDMA. The uplink radio resources provided in LTE are divided into frequency and temporal components. The divided resources are allocated to users, or specifically, to mobile terminals.

FIG. 1 is an illustrative diagram showing a radio frame, slots and RBs (Resource Blocks) in LTE. One RB is composed of 12 sub-carriers. There exist 100 RBs in a 20 MHz system. There exist 50 RBs in a 10 MHz system. There exist 25 RBs in a 5 MHz system.

The radio base station generally uses PF (Proportional Fair) scheduling as the radio resource allocating method (see Patent Document 1).

As described in Patent Document 1, in PF scheduling, the fairness between the throughput per cell and the throughput between mobile terminals are taken into consideration.

According to PF scheduling, the radio base station, first, calculates for every mobile terminal, the ratio between the average throughput of the mobile terminal and the feasible throughput of the mobile terminal, calculated from the radio condition at the point where the mobile terminal is located. The radio base station compares the ratio with others, and allocates radio resources to the mobile terminals that have not been preferentially allocated with radio resources in the past when the radio condition is fine.

Selection index M of each mobile terminal in PF scheduling is given as follows, using average throughput $X(n)$ of the mobile terminal at the present point of time n and the feasible throughput $R(n)$ of the mobile terminal under the radio conditions that exist at the point where the mobile terminal at the present point of time n is located:

$$M(n) = \frac{R(n)}{X(n)} \quad \text{[Math 1]}$$

Here, as $M(n)$ of a mobile terminal is greater, the mobile terminal is more likely to be allocated with radio resources.

Specifically, on the uplink the radio base station calculates the SINR (Signal to Interference and Noise power Ratio) for the SRS (Sounding Reference Signal) included in the received data from a mobile terminal. The radio base station, based on the result (SINR), estimates the throughput R that the mobile terminal can realize under the radio condition at the point where the mobile terminal is located.

On the other hand, on the downlink the radio base station, using the CQI (Channel Quality Indicator) reported from the mobile terminal, estimates the throughput R that the mobile terminal can realize under the radio conditions that exist at the point where the mobile terminal is located.

Further, when allocation of radio resources to the mobile terminal is made, the radio base station calculates:

$$X(n+1) = \left(1 - \frac{1}{T}\right)X(n) + \frac{1}{T}R(n) \quad \text{[Math 2]}$$

to compute the average throughput X of the mobile terminal.

On the other hand, when RB allocation has not been made, the radio base station calculates:

$$X(n+1) = \left(1 - \frac{1}{T}\right)X(n) \quad \text{[Math 3]}$$

to compute the average throughput X of the mobile terminal. Here, T represents the average window size.

Patent Document 2 discloses a mobile communication system that performs PF scheduling by taking into account the traffic at the base station.

In this mobile communication system, the mobile terminal selects a radio base station by taking into account the traffic at the radio base station. The mobile terminal transmits the throughput DRC (predictive data communication speed) which the terminal can realize under the radio conditions that exist at the point where the terminal is located. The radio base station calculates a selection index M for each of the mobile terminals that have transmitted DRC to the base station. Based on each selection index M, the radio base station selects mobile terminals to which radio resources should be allocated.

Patent Document 3 discloses a packet transmission control apparatus that can realize various schedulers including a Max C/I (Maximum C/I) scheduler, PF scheduler, M-LWDF (Modified Largest Weighted Delay First) scheduler, etc., by implementation of a calculation program of one evaluation function.

In a Max C/I scheduler, the selection index M of the mobile terminal is calculated using an equation $M=R$. This equation, i.e., $M=R$ is the calculation formula of the selection index M used in the PF scheduler from which the average throughput X of the mobile terminal is left out.

In a M-LWDF scheduler, the resident time of a packet in the radio base station and the service priority are incorporated in the calculation formula of the selection index M used in a PF scheduler.

PRIOR ART DOCUMENTS

Patent Document

Patent Document 1: JP2006-352884A
Patent Document 2: JP2006-94374A
Patent Document 1: JP2004-312190A

SUMMARY OF THE INVENTION

Problems to be Solved by the Invention

There is a problem of imbalance resource usage between users in a fixed communication network. To deal with this, there is a movement to impose traffic controls on users who transmit and receive large amounts of data using P2P file exchange software etc.

In communication using LTE, the communication speed is improved compared to the third generation mobile communication. With this improvement, the data traffic is also expected to increase in the communication using LTE. Accordingly, in the communication using LTE, the existing problem in the present fixed communication network, that is, imbalance resource usage between users is expected to occur. It is therefore necessary to investigate the measures against this problem in the communication using LTE.

In the PF scheduling described in Patent Document 1 and in the PF scheduling described in Patent Document 2, the average throughput of the mobile terminal is taken into consideration but the amount of data that the mobile terminal has transmitted/received up to a point of time (e.g., the point of time immediately before starting scheduling) is not taken into consideration.

Also in the Max C/I scheduler described in Patent Document 3, no consideration is given for the amount of data the mobile terminal has transmitted/received up to a point of time (e.g., the point of time immediately before starting scheduling).

Accordingly, in the PF scheduling described in Patent Document 1, the PF scheduling described in Patent Document 2 and the Max C/I scheduler described in Patent Document 3, among a plurality of mobile terminals accommodated in the radio base station, there is a possibility that some mobile terminals that transmit/receive greater amounts of data compared to the other mobile terminals exhaust the radio resources.

That is, the technologies disclosed in Patent Documents 1, 2 and 3 have the problem that it is difficult to secure throughput fairness between mobile terminals.

The object of the present invention is to provide a radio base station, scheduling system, allocation control method and recording medium that can solve the above-described problem.

Means for Solving the Problems

A radio base station according to the present invention is a radio base station that can communicate with a management device controlling a mobile terminal and that accommodates the mobile terminal, the radio base station includes: reception means for receiving an adjustment value in conformity with the amount of data which the mobile terminal has transmitted/received within a predetermined period, from the management device; and allocation means for controlling radio resources to be allocated to the mobile terminal, based on the adjustment value received by the reception means when a predetermined operational conditions are satisfied.

A scheduling system according to the present invention includes: the radio base station as described above; a management device that stores an adjustment value in conformity with the amount of data which a mobile terminal that is accommodated by the radio base station has transmitted/received within a predetermined period.

An allocation control method according to the present invention is an allocation control method implemented by a radio base station that can communicate with a management device controlling a mobile terminal and that accommodates the mobile terminal, the method includes: receiving an adjustment value in conformity with the amount of data which the mobile terminal has transmitted and received within a predetermined period, from the management device; and controlling radio resources to be allocated to the mobile terminal, based on the adjustment value when predetermined operational conditions are satisfied.

An allocation control method according to the present invention is an allocation control method implemented by a scheduling system including a management device controlling a mobile terminal, and a radio base station that can communicate with the management device and that accommodates the mobile terminal, wherein the management device implements storing an adjustment value in conformity with the amount of data which the mobile terminal has transmitted and received within a predetermined period, the radio base station implements receiving the adjustment value from the management device, and the radio base station implements controlling radio resources to be allocated to the mobile terminal, based on the adjustment value when predetermined operational conditions are satisfied.

A recording medium according to the present invention is a computer-readable recording medium which is recorded with a program for causing a computer that can communicate with a management device controlling a mobile terminal and that accommodates the mobile terminal, to execute: a reception procedure of receiving an adjustment value in conformity with the amount of data which the mobile terminal has transmitted/received within a predetermined period, from the management device; and an allocation procedure of controlling radio resources to be allocated to the mobile terminal, based on the adjustment value when the predetermined operational conditions are satisfied.

Effect of the Invention

According to the present invention, it is possible to improve throughput fairness between mobile terminals.

MODE FOR CARRYING OUT THE INVENTION

Now, the exemplary embodiment of the present invention will be described with reference to the drawings.

Figure 2:
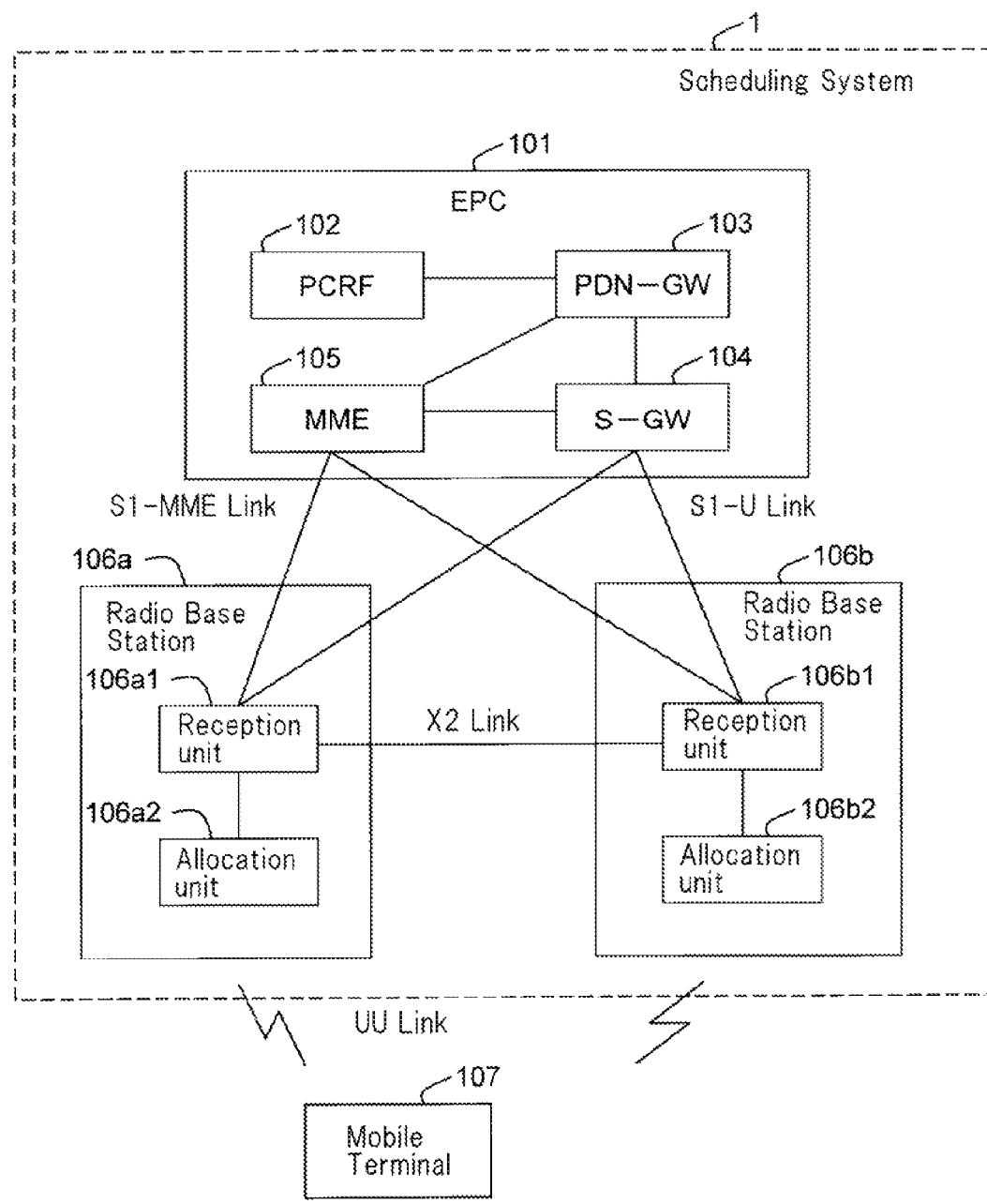
FIG. 2 is a block diagram showing scheduling system 1 of one exemplary embodiment of the present invention.

FIG. 2 is a block diagram showing scheduling system 1 of one exemplary embodiment of the present invention.

In FIG. 2, scheduling system 1 operates based on LTE. Scheduling system 1 includes EPC (Evolved Packet Core) 101 and a plurality of radio base stations 106a and 106b. The number of radio base stations are not limited to two but can be changed as appropriate. Radio base stations 106a and 106b each communicate with mobile terminal 107 that is present in the cell set up by each base station. Here, the number of base stations 107 is not limited to one but can be changed as appropriate.

EPC 101 can be generally called a management device. EPC 101 can communicate with radio base stations 106a and 106b.

EPC 101 stores an adjustment value corresponding to the amount of data mobile terminal 107 has transmitted and received within a predetermined fixed period (e.g., 24 hours). For example, EPC 101 measures the amount of data transmitted/received by mobile terminal 107 and generates an adjustment value based on the measured amount of data and stores the value. Here, the fixed period is not limited to 24 hours but may be changed as appropriate.

EPC 101 includes diverse nodes, namely, PCRF (Policy and Charging Rules Function) 102, PDN-GW (Public Data Network Gateway) 103, S-GW (Serving Gateway) 104 and MME (Mobility Management Entity) 105.

PCRF 102 has the function of charging the users of mobile terminals 107 in accordance with the services each mobile terminal 107 has received. PCRF 102 also holds information on the amount of data transmitted/received by each mobile terminal 107 during a fixed period of time.

PDN-GW 103 has the function of measuring the amount of data each mobile terminal 107 has exchanged on the uplink and downlink. PDN-GW 103 also has a counter i for each mobile terminal 107. PDN-GW 103 has the function of calculating the value of counter i corresponding to each mobile terminal, based on the sum total of the measured amounts of data on the uplink and downlink.

The value on counter i is one example of the adjustment value. In the present embodiment, the lower the amount of data exchanged on the uplink and downlink is, the smaller the value on counter i becomes.

Further, PDN-GW 103 has the function of transferring the value on counter i for each mobile terminal 107 to MME 105. Also, PDN-GW 103 stores the sum total of the measured amounts of data on the uplink and downlink into PCRF 102.

S-GW 104 has the function of transmitting/receiving data between radio base stations 106a and 106b.

MME 105 has the function of holding the value on counter i of each mobile terminal 107 as part of the context of each mobile terminal 107.

MME 105 has the function of notifying radio base station 106a of the value on counter i of each mobile terminal 107 accommodated in radio base station 106a from among all the values of counters i for mobile terminals 107. MME 105 also has the function of notifying radio base station 106b of the value on counter i of each mobile terminal 107 accommodated in radio base station 106a from among all the values of counters i for mobile terminals 107.

Here, EPC 101 may be realized by a computer that operates in accordance with the program recorded on a CD-ROM, hard disk or memory. Generally, CD-ROMs, hard disks and memory can be called computer-readable recording mediums.

In this case, the computer executes reading of the program from the recording medium and provides the functions of PCRF 102, PDN-GW 103, S-GW 104 and MME 105 to realize EPC 101.

S-GW 104 is connected to radio base stations 106a and 106b by S1-U links. MME 105 is connected to radio base stations 106a and 106b by S1-MME links. Here, S1-U links and S1-MME links can be generally called S1 links. Radio base station 106a and radio base station 106b are connected by X2 link.

Figure 1:
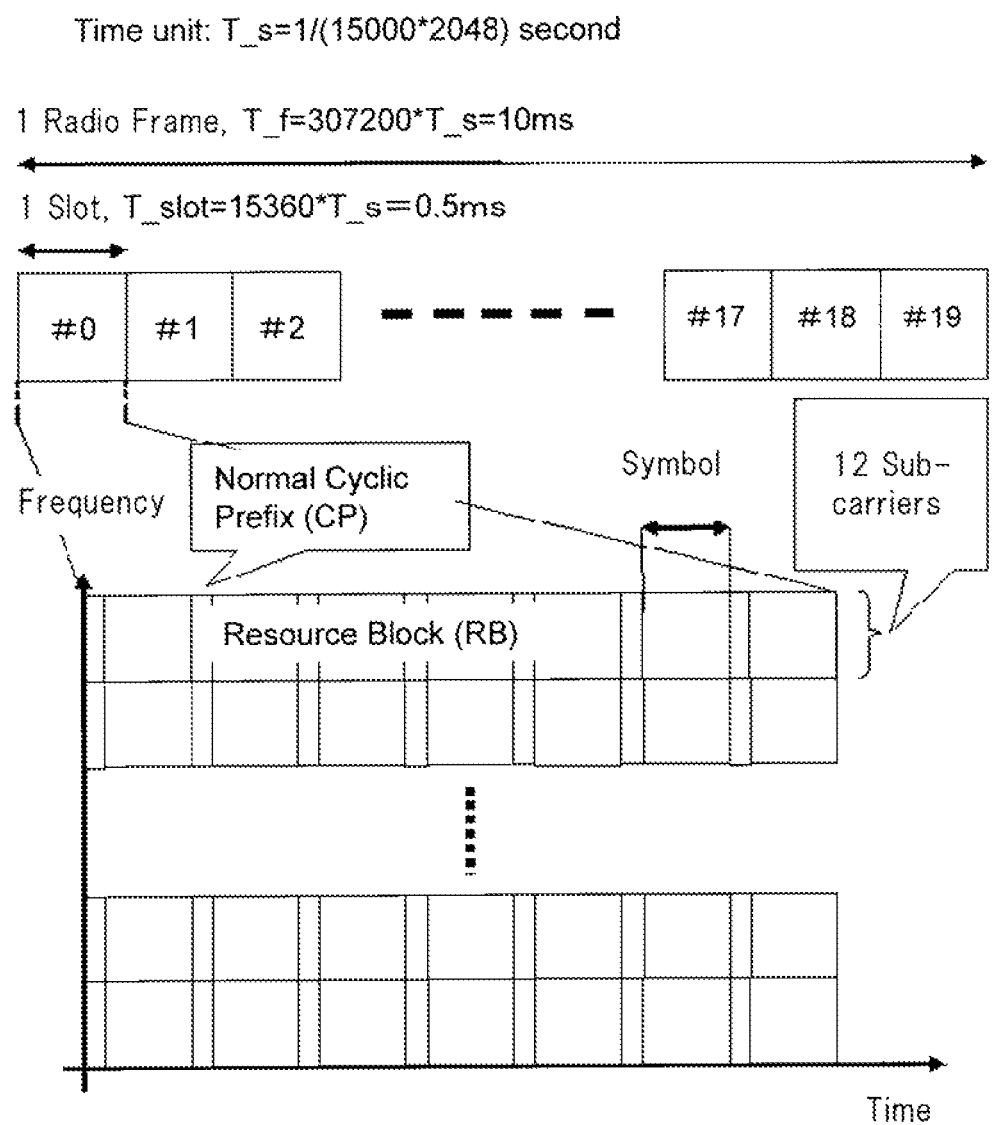
FIG. 1 is an illustrative diagram showing a radio frame, slots and RBs in LTE.

Radio base stations 106a and 106b each manage radio resources shown in FIG. 1. Radio base stations 106a and 106b each have the function of measuring RB usage ratios on the uplink and downlink. Further, radio base stations 106a and 106b have the function of allocating radio resources to each mobile terminal 107, using the value on counter i (adjustment value) notified from MME 105.

Radio base stations 106a and 106b function as a management device when they play the role of an original radio base station upon handover.

Radio base station 106a includes reception unit 106a1 and allocation unit 106a2. Radio base station 106b includes reception unit 106b1 and allocation unit 106b2.

Reception units 106a1 and 106b1 have the same functions. Therefore, of reception units 106a1 and 106b1, only reception unit 106a1 will be described in the following description. Also, allocation units 106a2 and 106b2 have the same functions. Therefore, of allocation units 106a2 and 106b2, only allocation unit 106a2 will be described in the following description.

Reception unit 106a1 can be generally called reception means.

Reception unit 106a1 receives the value of counter i, or the adjustment value corresponding to the amount of data mobile terminal 107 has transmitted and received during a fixed period of time.

For example, when radio base station 106a accommodates mobile terminal 107 by call establishment with mobile terminal 107, reception unit 106a1 receives the adjustment value for mobile terminal 107, i.e., the value of counter i, from EPC 101.

On the other hand, when radio base station 106a accommodates mobile terminal 107 by handover of mobile terminal 107 from radio base station 106b, reception unit 106a1 receives the adjustment value for mobile terminal 107, i.e., the value of counter i, from EPC 101 or radio base station 106b.

Allocation unit 106a2 can be generally called allocation means.

Allocation unit 106a2, when the predetermined operational conditions are satisfied, controls radio resources to be allocated to mobile terminal 107, based on the value on counter received by reception unit 106a1.

In the present exemplary embodiment, the smaller the value on counter i, the greater is the amount of radio recourses that allocation unit 106a2 allocates to mobile terminal 107 corresponding to the value.

When the value on counter i as the amount of data that mobile terminal 107 has transmitted/received in a fixed period of time becomes greater, the amount of data mobile terminal 107 has transmitted/received in a fixed period of time, the amount of radio resources to be allocated to mobile terminal 107 corresponding to the value is lowered.

Allocation unit 106$a2$ also calculates first throughput information R that indicates the throughput mobile terminal 107 can realize under the radio conditions that exist at the point where mobile terminal 107 is present and second throughput information X that indicates the average throughput of mobile terminal 107.

Here, as the method of calculating first throughput information R and second throughput information X, a publicly known technique used when PF scheduling is effected can be used Since this technique is publicly known as stated above, its detailed description is omitted.

Allocation unit 106$a2$, when the predetermined operational conditions are satisfied, controls radio resources to be allocated to mobile terminal 107, based on first throughput information R, second throughput information X and the value on counter i.

Here, the operational conditions include, for example, a condition in which the usage ratio of radio resources is equal to or greater than a predetermined threshold.

Further, the operational conditions may include, for example, a condition in which the service requested by mobile terminal 107 is a non-GBR service with which no bit rate is guaranteed. In this case, allocation unit 106$a2$ specifies the service to be requested by mobile terminal 107.

Here, radio base station 106$a$ may be realized by a computer that operates in accordance with the program recorded on a CD-ROM, hard disk or memory. In this case, the computer executes reading of the program from the recording medium, provides the functions of reception unit 106$a1$ and allocation unit 106$a2$ to realize radio base station 106$a$.

Similarly to radio base station 106$a$, radio base station 106$b$ may also be realized by a computer that operates in accordance with a program.

Mobile terminal 107 is given as a mobile phone or PDA (Personal Digital Assistants), for example.

The wireless sections between mobile terminal 107, and radio base stations 106$a$ and 106$b$ are called UU links. Mobile terminal 107 has the function of exchanging data with radio base station 106$a$ or 106$b$.

Each unit in FIG. 2 has diverse kinds of functions other than those described herein, but the functions are well known to those skilled in the art, so that a description of the detailed functions is omitted.

Here, the sequence for call processing in scheduling system 1 will be briefly explained with reference to the drawings. This sequence is a sequence of call processing defined by the 3GPP (3rd Generation Partnership Project) standard.

Figure 3:
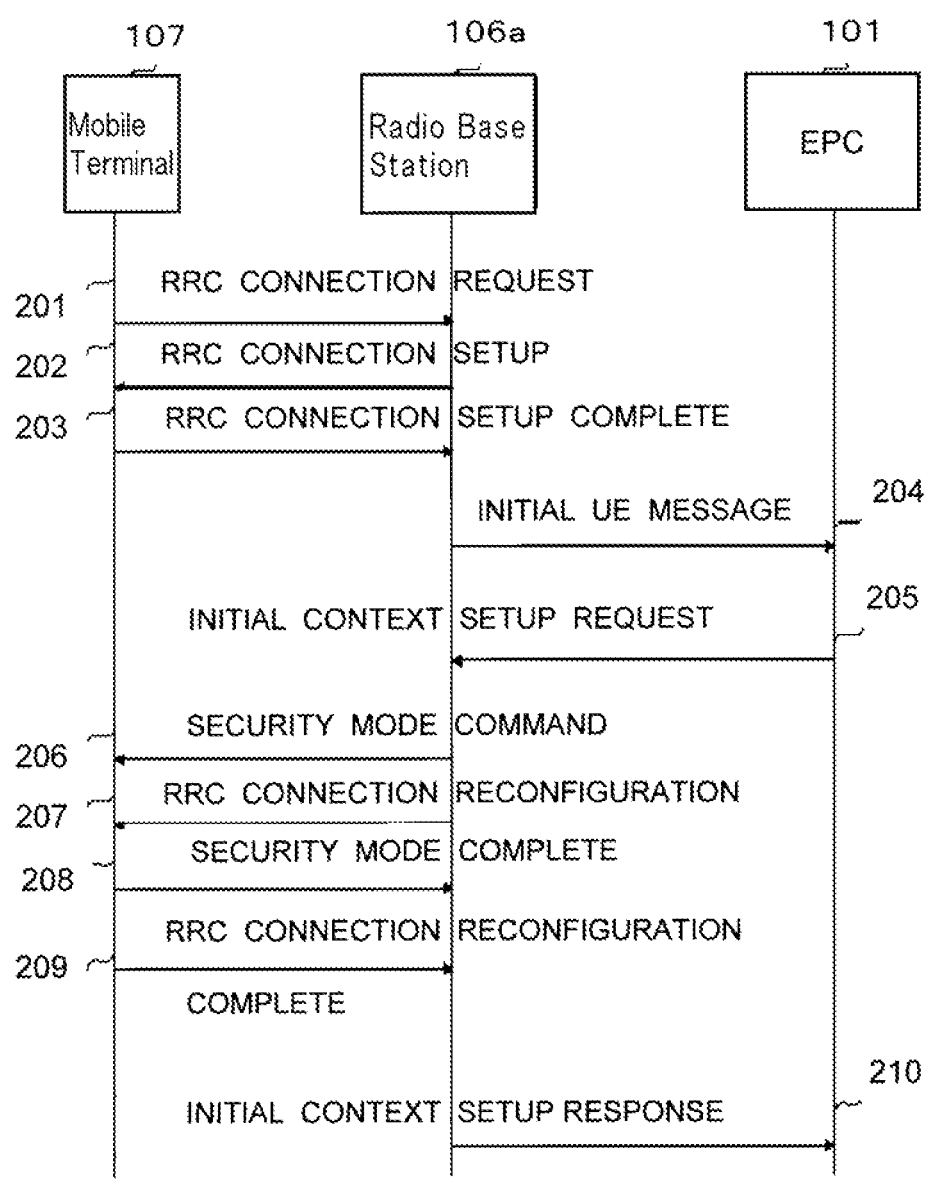
FIG. 3 is a sequence diagram for illustrating a procedure of call establishment.

FIG. 3 is a sequence diagram for illustrating the procedure for call establishment. FIG. 3 the same components as those shown in FIG. 2 are allotted with the same reference numerals.

Control channel is established on UU link by messages 201-203. Then, S1 link is established by messages 204, 205 and 210. Security is established on UU link by messages 206-209.

Here, message 201 is RRC CONNECTION REQUEST. Message 202 is RRC CONNECTION SETUP. Message 203 is RRC CONNECTION SETUP COMPLETE. Message 204 is INITIAL UE MESSAGE. Message 205 is INITIAL CONTEXT SETUP REQUEST. Message 206 is SECURITY MODE COMMAND. Message 207 is RRC CONNECTION RECONFIGURATION. Message 208 is SECURITYMODE COMPLETE. Message 209 is RRC CONNECTION RECONFIGURATION COMPLETE. Message 210 is INITIAL CONTEXT SETUP RESPONSE.

Figure 4:
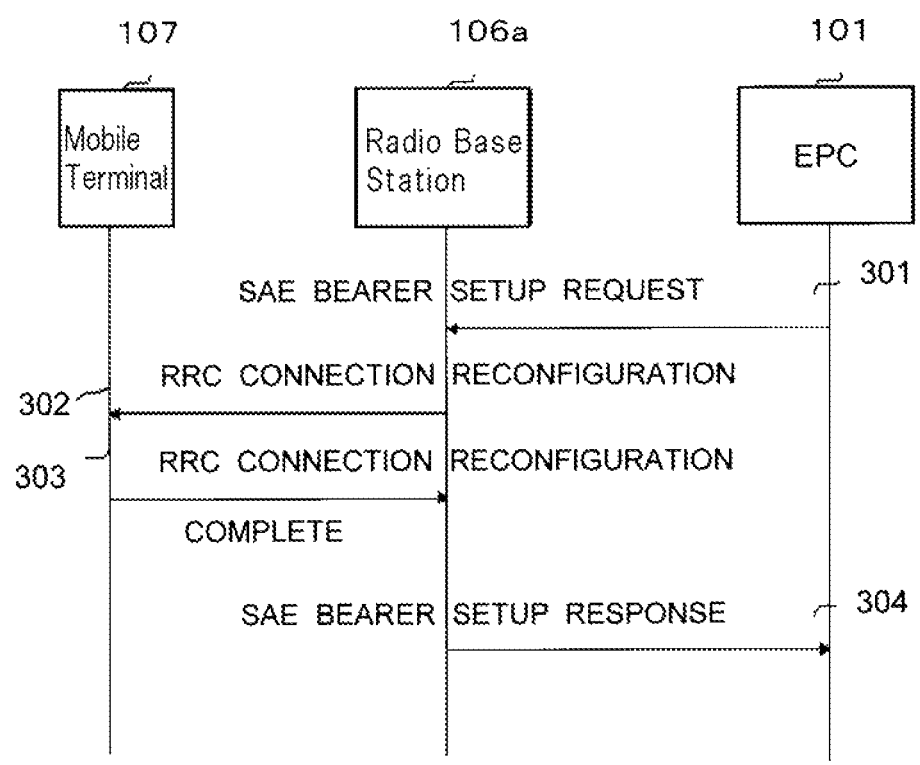
FIG. 4 is a sequence diagram for illustrating a procedure of SAE bearer establishment.

FIG. 4 is a sequence diagram for illustrating a procedure of SAE (System Architecture Evolution) bearer establishment. In FIG. 4 the same components as those shown in FIG. 2 are allotted with the same reference numerals.

SAE bearer is established on UU link and S1 link by messages 301-304. Thereby, user data transmission is carried out.

Here, message 301 is SAE BEARER SETUP REQUEST. Message 302 is RRC CONNECTION RECONFIGURATION. Message 303 is RRC CONNECTION RECONFIGURATION COMPLETE. Message 304 is SAE BEARER SETUP RESPONSE.

Figure 5:
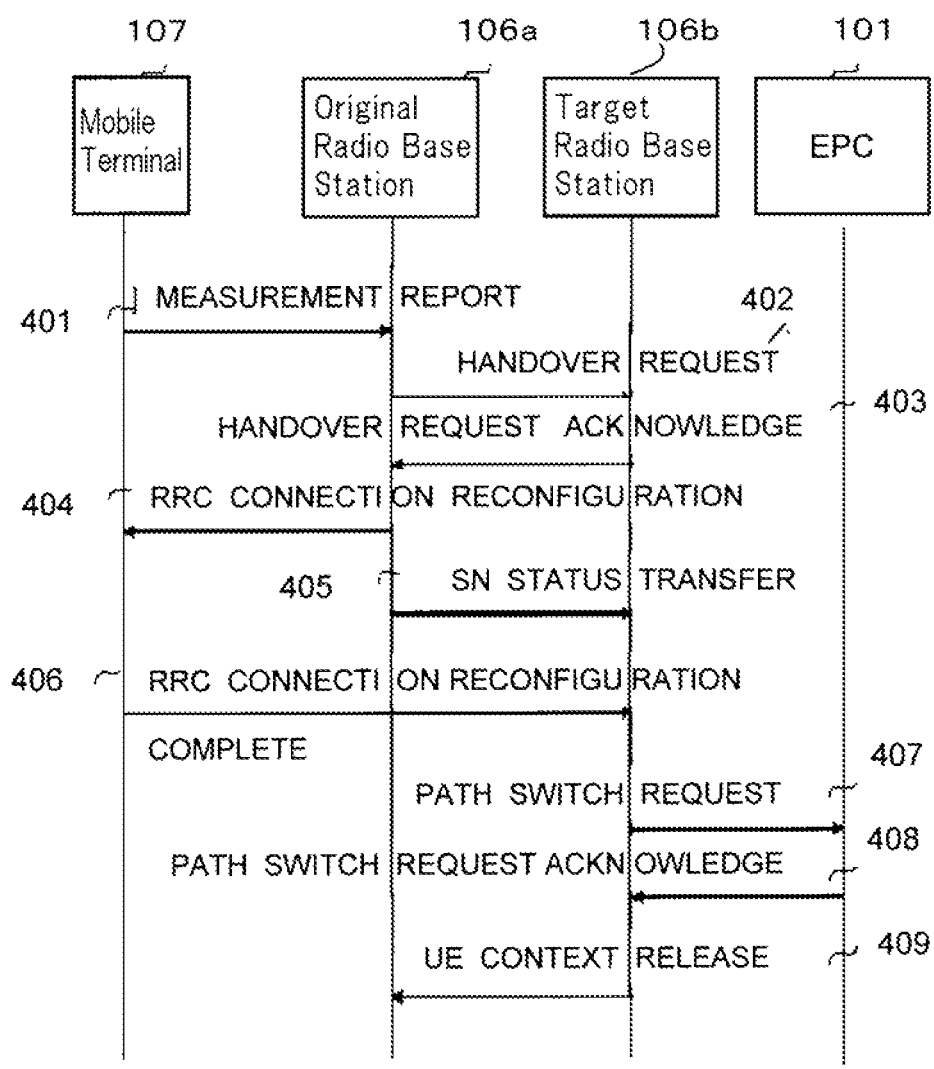
FIG. 5 is a sequence diagram for illustrating a handover procedure at the time of using X2 link.

FIG. 5 is a sequence diagram for illustrating a handover procedure when X2 link is used. In FIG. 5 the same components as those shown in FIG. 2 are allotted with the same reference numerals.

At Step 401, when receiving measurement control information, mobile terminal 107 measures the received signal intensity in each cell selected by the measurement control information. Detailedly, mobile terminal 107 receives a pilot signal from target radio base station 106$b$ that controls each of the selected cells, and measures the received signal intensity of the cell based on the pilot signal. When the received signal intensity becomes equal to or greater than the previously set threshold, mobile terminal 107 transmits a measurement report (MEASUREMENT REPORT) that the received signal intensity has become equal to or greater than the threshold target, to original radio base station 106$a$.

Subsequently, at Step 402, original radio base station 106$a$ transmits a handover request (Handover Request) message for executing a handover, to target radio base station 106$b$.

The handover request message includes information on X2 interface, information on S1 interface, information on SAE bearer and information showing RRC setup.

Here, X2 interface is the interface for establishing mutual connection between radio base station 106$a$ and radio base station 106$b$. S1 interface is the interface for establishing mutual connection between radio base stations 106$a$ and 106$b$, and EPC 101. Information on SAE bearer includes QoS (Quality of Service) information.

Target radio base station 106$b$ extracts the transport layer address (Transport Layer Address) of original radio base station 106$a$ from the information on X2 interface. Target radio base station 106$b$ also extracts the transport layer address of EPC 101 from the information on S1 interface.

Subsequently, at Step 403 target radio base station 106$b$ transmits an approval response (Handover Request Acknowledge) for approval of the handover request message, to original radio base station 106$a$. This approval response includes a transparent container to mobile terminal 107.

Then, at Step 404, when receiving the approval response, original radio base station 106$a$ transmits RRC Connection Reconfiguration that indicates execution of a handover, to mobile terminal 107. RRC Connection Reconfiguration includes the transparent container from target radio base station 106$b$.

Next, at Step 405, original radio base station 106$a$ transmits the reception status of the uplink PDCP sequence number and the transmission status of the downlink PDCP sequence number for each SAE bearer, to target radio base station 106$b$.

Subsequently, at Step 406, mobile terminal 106 transmits complete information (RRC Connection Reconfiguration Complete) that indicates completion of the handover, to target radio base station 106$b$.

Then, at Step 407, target radio base station 106*b* transmits a path switch (Path Switch Request) message for notifying that the mobile terminal 107 has moved from one to another, to EPC 101.

Next, at Step 408, EPC 101 transmits a path switch approval response (Path Switch Request Acknowledge) message to target radio base station 106*b*.

Then, at Step 409, when receiving the path switch approval response message, target radio base station 106*b* transmits a release request (UE Context Release) that indicates release of resources, to original radio base station 106*a*, to thereby notify original radio base station 106*a* of the success of the handover.

Figure 6:
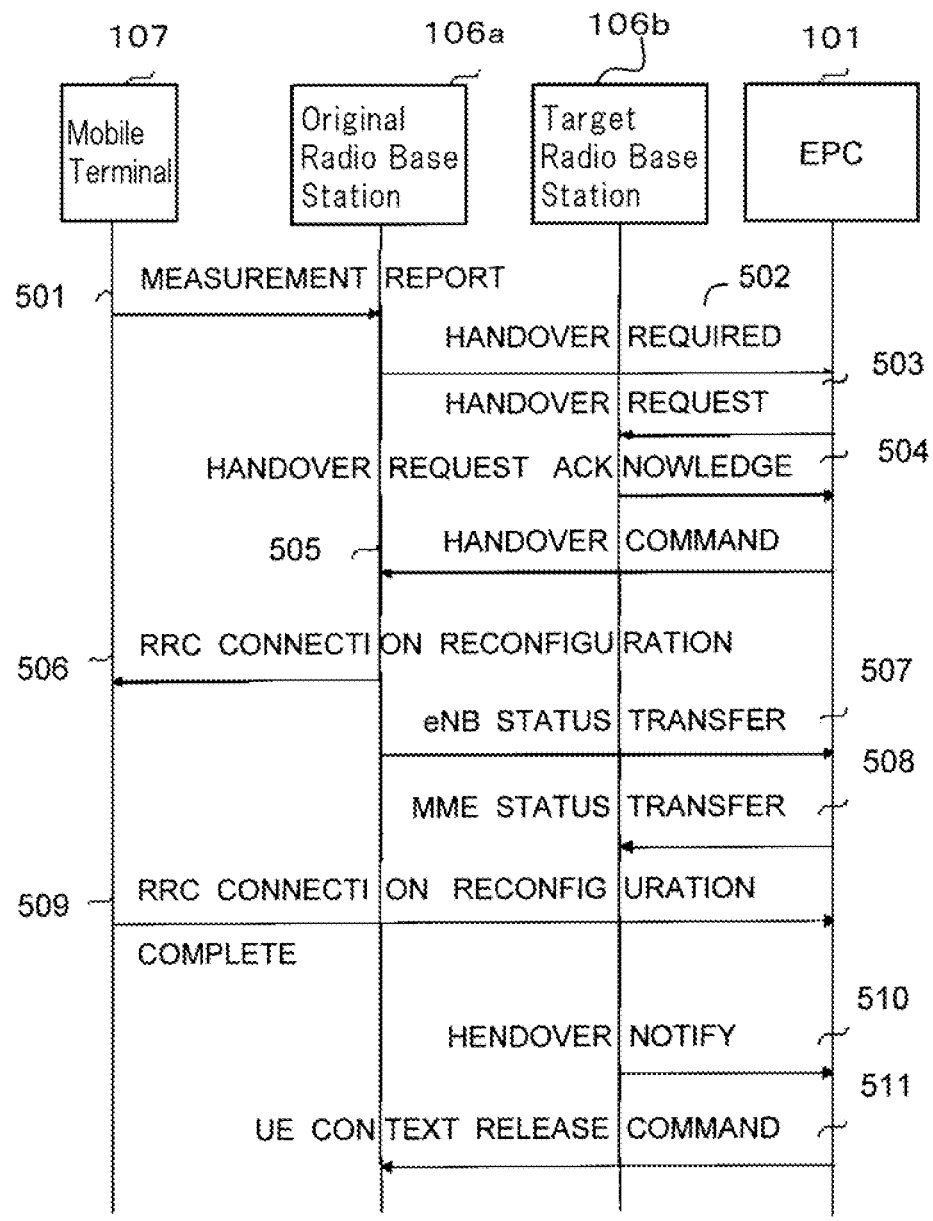
FIG. 6 is a sequence diagram for illustrating a handover procedure at the time of using S1 link.

FIG. 6 is a sequence diagram for illustrating a handover procedure when S1 link is used. In FIG. 6, the same components as those shown in FIG. 2 are allotted with the same reference numerals.

At Step 501, when receiving measurement control information, mobile terminal 107 measures the received signal intensity in each cell selected by measurement control information. Detailedly, mobile terminal 107 receives a pilot signal from target radio base station 106*b* that controls each of the selected cells, and measures the received signal intensity of the cell based on the pilot signal. When the received signal intensity becomes equal to or greater than the previously set threshold, mobile terminal 107 transmits a measurement report (MEASUREMENT REPORT) that the received signal intensity has become equal to or greater than the threshold target, to original radio base station 106*a*.

Subsequently, at Step 502, original radio base station 106*a* transmits a handover request (Handover Required) message for executing a handover, to EPC 101.

Then, at Step 503, EPC 101 transmits a handover request (Handover Request) message for executing a handover, to target radio base station 106*b*.

The handover request message includes information on S1 interface, information on SAE bearer and information showing RRC setup.

Target radio base station 106*b* extracts the transport layer address of EPC 101 from the information on S1 interface.

Subsequently, at Step 504 target radio base station 106*b* transmits an approval response (Handover Request Acknowledge) for approval of the handover request message, to EPC 101. This approval response includes a transparent container to mobile terminal 107.

Then, at Step S505, EPC 101 transmits an approval response (Handover Command) for approval of the handover request message, to original radio base station 106*a*. This approval response includes a transparent container to mobile terminal 107.

Next, at Step 506, when receiving the approval response, original radio base station 106*a* transmits RRC Connection Reconfiguration that indicates execution of a handover, to mobile terminal 107. RRC Connection Reconfiguration includes a transparent container from target radio base station 106*b*.

Then, at Step 507, original radio base station 106*a* transmits the reception status of the uplink PDCP sequence number and the transmission status of the downlink PDCP sequence number for each SAE bearer, to EPC 101.

Further, at Step 508, EPC 101 transmits the reception status of the uplink PDCP sequence number and the transmission status of the downlink PDCP sequence number for each SAE bearer, to target radio base station 106*b*.

Subsequently, at Step 509, mobile terminal 107 transmits complete information (RRC Connection Reconfiguration Complete) that indicates completion of the handover, to target radio base station 106*b*.

Then, at Step 510, target radio base station 106*b* transmits a (Handover Notify) message for notifying that the mobile terminal 107 has moved from one cell to another cell, to EPC 101.

Further, at Step 511, when receiving the Handover Notify message, EPC 101 transmits a release request (UE Context Release Command) that indicates release of resources, to original radio base station 106*a*, to thereby notify original radio base station 106*a* of the success of the handover.

Figure 7:
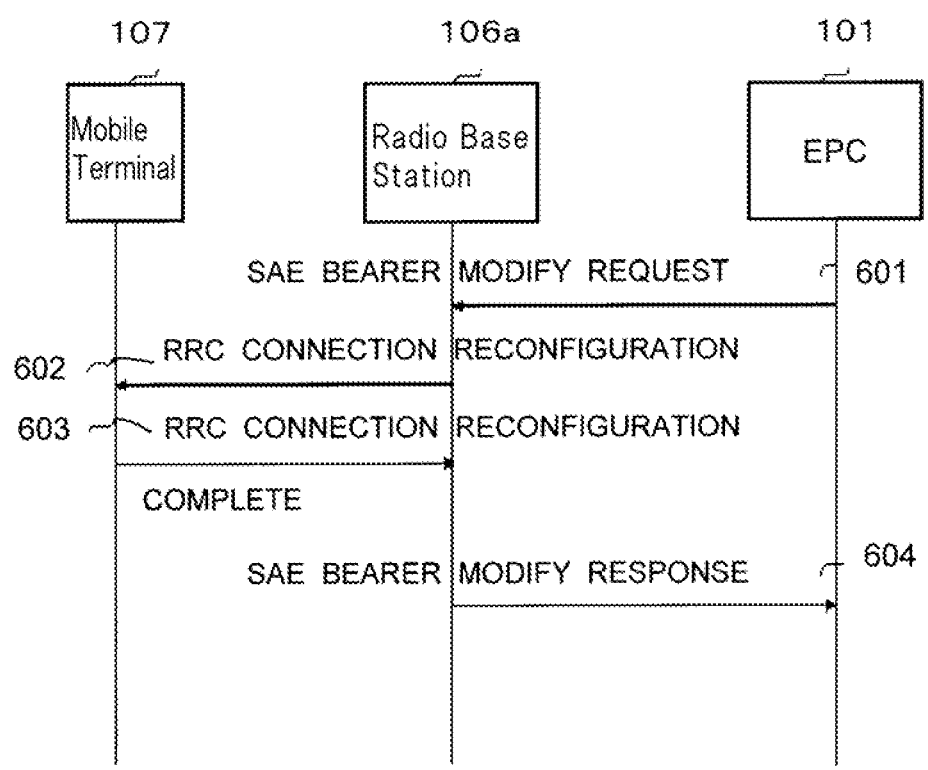
FIG. 7 is a sequence diagram for illustrating a procedure of SAE bearer modification.

FIG. 7 is a sequence diagram for illustrating a procedure of SAE bearer modification. In FIG. 7, the same components as those shown in FIG. 2 are allotted with the same reference numerals.

Setting of SAE bearer is modified on the UU link and S1 link by messages 601-604.

Here, message 601 is SAE BEARER MODIFY REQUEST. Message 602 is RRC CONNECTION RECONFIGURATION. Message 603 is RRC CONNECTION RECONFIGURATION COMPLETE. Message 604 is SAE BEARER MODIFY RESPONSE.

Next, a scheme of operation will be described.

Figure 8:
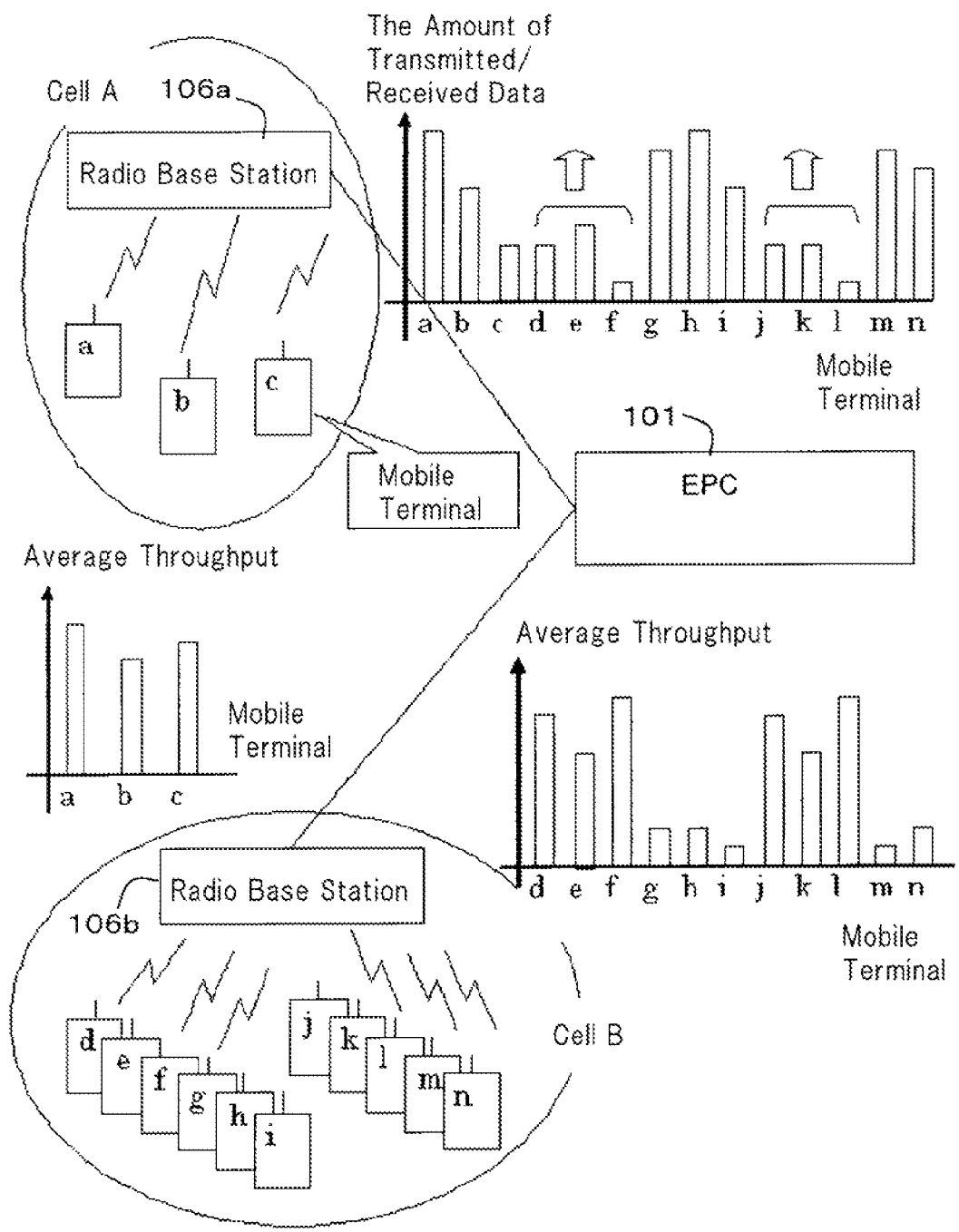
FIG. 8 is an illustrative diagram for illustrating a scheme of an operation of the present exemplary embodiment.

FIG. 8 is an illustrative diagram for illustrating a scheme of operation of the present exemplary embodiment.

EPC 101 controls the sum total of the amount of uplink and downlink data of each mobile terminal 107.

Radio base stations 106*a* and 106*b* control cells. In FIG. 8, there are three mobile terminals a-c in cell A, whereas there are eleven mobile terminals d-n in cell B.

It is assumed that in cell A the RB usage ratio for uplink and downlink is less than the threshold. Accordingly, radio base station 106*a* will not execute radio resource allocation, taking into consideration the amounts of data that mobile terminals a-c have transmitted/received.

On the other hand, it is assumed that in cell B the RB usage ratio for downlink is equal to or greater than the threshold. Accordingly, radio base station 106*b* executes radio resource allocation to mobile terminals d-n, taking into consideration the amounts of data that mobile terminals d-n have transmitted/received, respectively.

Accordingly, in cell B, allocation unit 106*b*2 in radio base station 106*b* allocates radio resources preferentially to mobile terminals d-f and j-l that have lower amounts of transmitted and received data.

As a result, no large variation will occur in average throughput as for mobile terminals a-c. On the other hand, a large variation occurs in average throughput as for mobile terminals d-n.

Since each mobile terminal moves from one cell to another, there is present a mobile terminal that moves from a cell such as cell A to another cell such as cell B. Accordingly, radio resource allocation will be made such that the variation of the amount of uplink and downlink data between mobile terminals is made small in the long-term view.

Next, a scheme of operation of EPC 101, radio base stations 106*a* and 106*b* will be described.

First, a scheme of operation of EPC 101 will be described.

During a procedure of call establishment, EPC 101 checks the amount of data transmitted and received by mobile terminal 107, from a point of time retroactive to a fixed period ago, e.g., 24 hours, up to that point.

EPC 101 calculates the value of counter i in accordance with the amount of data. Here, the value on counter i becomes greater as the amount of data becomes larger. EPC 101 also holds the value of counter i as the context of mobile terminal 107. Then, EPC 101 notifies radio base station 106a or 106b of the value of counter i.

EPC 101 measures the amounts of uplink and downlink data of mobile terminal 107 while mobile terminal 107 is being engaged in communication.

Here, EPC 101 adds the measured amount of data to the amount of data checked at the time of call establishment.

For each mobile terminal 107, EPC 101 increases the value on counter i corresponding to mobile terminal 107 every time the sum total of the amounts of uplink and downlink data exceeds a prescribed amount of data. Then, EPC 101 notifies radio base station 106a or 106b of the updated value of counter i.

Figure 9:
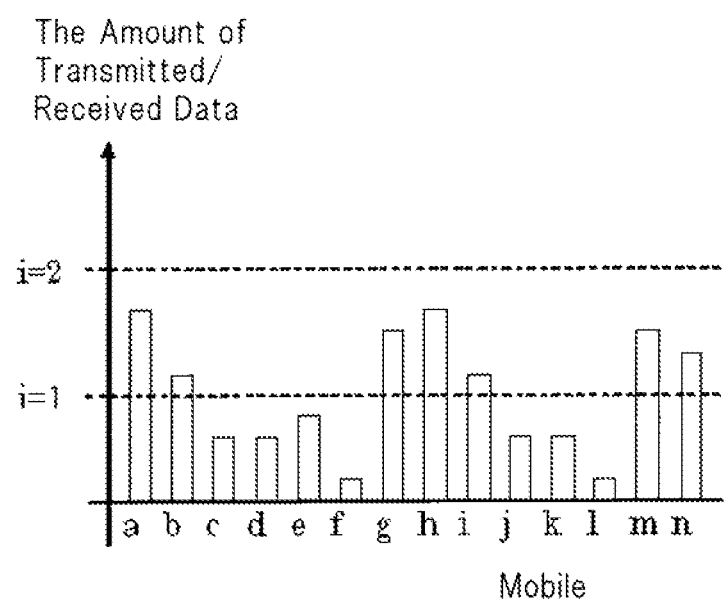
FIG. 9 is an illustrative diagram for illustrating a method of calculating the values of counters i of mobile terminals a-n.

FIG. 9 is an illustrative diagram for illustrating the method of calculating the values of counters i of mobile terminals a-n.

For each of mobile terminals a-n that are under the control of EPC 101, EPC 101 increases the value on counter i corresponding to the mobile terminal whose sum total of the amounts of data has exceeded a prescribed value every time the sum total of the amounts of uplink and downlink data exceeds the prescribed value.

It is also possible to consider a method in which the radio base station measures the amounts of uplink and downlink data for each mobile terminal and controls allocation of radio resources based on the measured amount of data.

However, in this method, the original radio base station needs to give the measured information to the target radio base station every time a handover of a mobile terminal is implemented. Besides, the amount of data to be transferred at the time of a handover becomes large. Therefore, it is preferable that EPC 101 carries out measurement of the amounts of uplink and downlink data. Then, EPC 101 only notifies the radio base station of the value of counter i for each mobile terminal.

Next, the scheme of operation of radio base stations 106a and 106b will be described. Here, since radio base stations 106a and 106b have the same functions, the scheme of operation of radio base station 106b will be described hereinbelow.

Reception unit 106b1 in radio base station 106b receives the value of counter i from EPC 101 or from original radio base station 106a.

At the time of call establishment, reception unit 106b1 is given notice of the value of counter i by S1 message from EPC 101: INITIAL CONTEXT SETUP REQUEST (see message 205 in FIG. 3) or SAE BEARER SETUP REQUEST (see message 301 in FIG. 3).

At the time of a handover using X2 link, reception unit 106b1 inside target radio base station 106b is given notice of the value of counter i by X2 message from original radio base station 106a: HANDOVER REQUEST (see Step 402 in FIG. 5).

At the time of a handover using S1 link, reception unit 106b1 inside target radio base station 106b is given notice of the value of counter i by S1 message from EPC 101: HANDOVER REQUEST (see Step 503 in FIG. 6).

Allocation unit 106b2 checks whether the service requested by mobile terminal 107 is a Guaranteed Bit Rate (GBR) service (a service for which the bit rate is guaranteed) or non-GBR service (a service for which the bit rate is not guaranteed).

As a GBR service, voice call communication can be considered. This is because if the service quality (delay and jitter) is not guaranteed, no voice call communication can take place. For this reason, non-GBR services alone are handled herein as the control target for radio resource allocation using the value of counter i.

If the service requested by mobile terminal 107 is that of non-GBR, allocation unit 106b2 checks the uplink RB usage ratio and downlink RB usage ratio in the cell under control.

When the uplink RB usage ratio is less than the prescribed threshold α and the downlink RB usage ratio is less than the prescribed threshold β, allocation unit 106b2 in radio base station 106b will not use the value of counter i to allocate radio resources.

When the uplink RB usage ratio is equal to or greater than the prescribed threshold α or the downlink RB usage ratio will be equal to or greater than the prescribed threshold β, allocation unit 106b2 will perform allocation of radio resources to mobile terminal 107 using the value of counter i.

Allocation unit 106b2 in radio base station 106b has a value $\gamma_i$ corresponding to the value of counter i. Here, $\gamma_i$ is equal to or greater than 1. It is also possible to use such a $\gamma_i$ that increases with increase of the value on counter i before the value of the counter i reaches a certain fixed value and becomes constant afterwards for the value on counter i equal to or greater than the fixed value.

Allocation unit 106b2 calculates first throughput information R and second throughput information X, and determines selection index M of mobile terminal 107, based on the following equation:

$$M = \frac{R}{X^{\gamma_i}}.$$ [Math 4]

As shown in Math 4, allocation unit 106b2 calculates selection index M for mobile terminal 107 by inflating the average throughput X of mobile terminal 107 based on the amount of data transmission/reception in the past.

Accordingly, the selection index M of a mobile terminal having a greater amount of data transmission/reception in the past becomes smaller. Allocation unit 106b2 preferentially allocates radio resources to mobile terminals having smaller selection indexes M from among all selection indexes M. Accordingly, radio resources to be allocated to mobile terminals having greater amounts of data transmission/reception in the past will be reduced.

When EPC 101 updates the value of counter i, radio base station 106b receives an update notice of the value of counter i from EPC 101. Reception unit 106b1 in radio base station 106b is given notice of the value of counter i by S1 message from EPC 101: SAE BEARER MODIFY REQUEST (see message 601 in FIG. 7).

Figure 10:
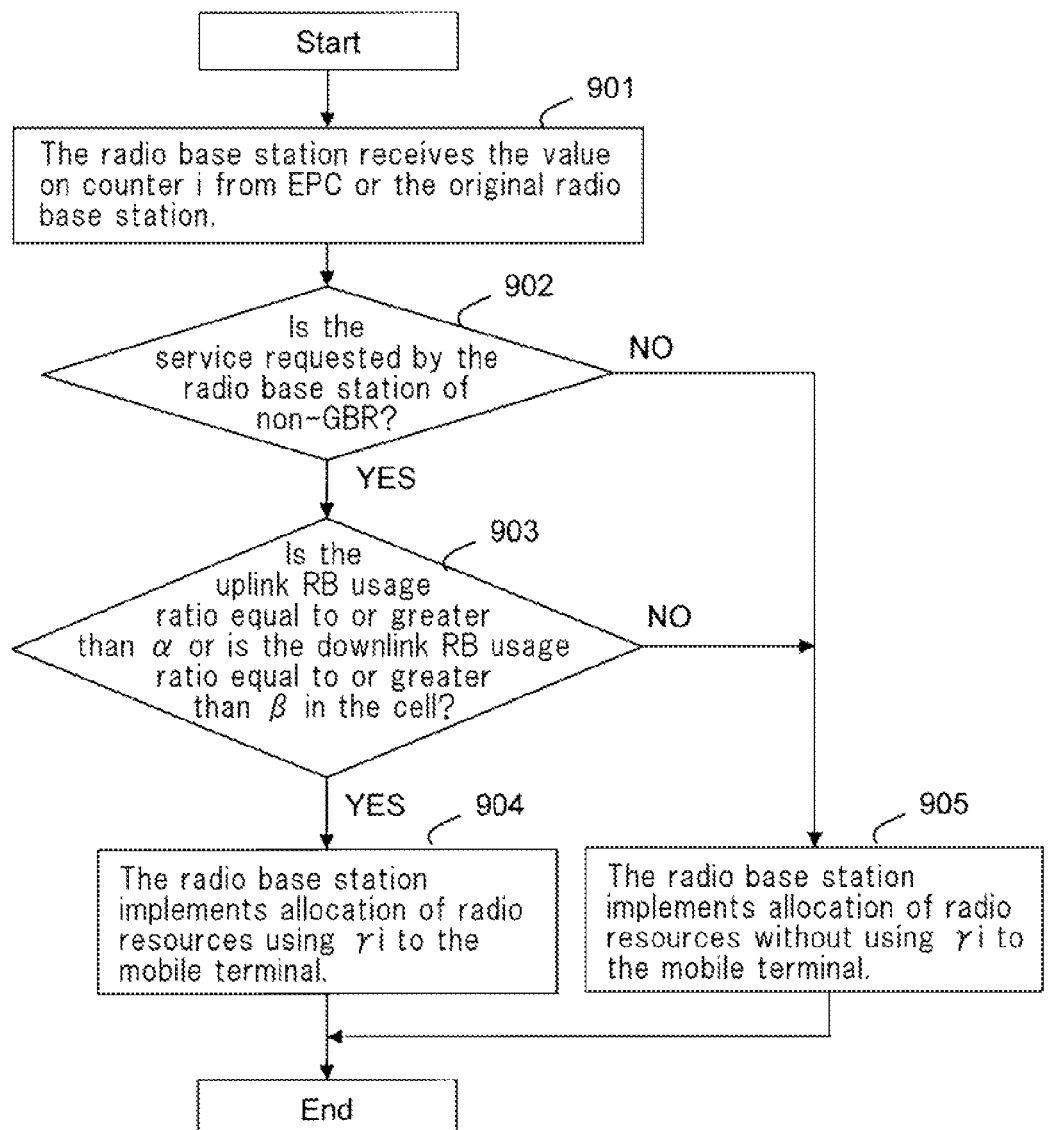
FIG. 10 is a flow chart for illustrating the above operation of radio base station 106b.

FIG. 10 is a flow chart for illustrating the above operation of radio base station 106b.

At Step 901, reception unit 106b1 receives the value of counter i from EPC 101 or original radio base station 106a.

Then, at Step 902, allocation unit 106b2 checks whether the service requested by mobile terminal 107 is that of non-GBR.

If the requested service is a non-GBR one, allocation unit 106b2 in radio base station 106b checks whether the uplink RB usage ratio in the cell is equal to or greater than threshold α, or whether the downlink RB usage ratio is equal to or greater than threshold β, at Step 903.

If the uplink usage ratio in the cell is equal to or greater than α, or if the downlink RB usage ratio is equal to or greater than β, allocation unit 106b2 implements radio resource allocation using $\gamma_i$, to mobile terminal 107, at Step 904.

When the uplink RB usage ratio in the cell is not equal to or greater than threshold α and when the downlink RB usage ratio is not equal to or greater than β, or when the requested service is not a non-GBR, allocation unit 106b2 implements radio resource allocation without use of $\gamma_i$ to mobile terminal 107, at Step 905. For this allocation, a publicly known scheduling technique is used, for instance.

Next, the operation will be described in detail.

To begin with, the operation at the time of call establishment and during communication will be described. The description hereinbelow will be given on the assumption that the operation for call establishment is carried out by radio base station 106a.

During the procedure for call establishment, PDN-GW 103 acquires from PCRF 102, the amount data having been transmitted and received by mobile terminal 107 from the point of time retroactive to a fixed period ago, e.g., 24 hours. Here, this amount of data is the amount of all the packet data including, for example, voice communication.

For each mobile terminal 107, PDN-GW 103 calculates the value of counter i corresponding to the mobile terminal, using the obtained amount of data. Subsequently, PDN-GW 103 notifies MME 105 of the value of each counter i.

During the procedure of call establishment, MME 105 transmits the value of counter i corresponding to the mobile terminal 107 for which a call is being established, to radio base station 106a. MME 105 holds the value of counter i, as part of the context for mobile terminal 107.

After call establishment, PDN-GW 103 measures the amounts of uplink and downlink data of mobile terminal 107. At this point, PDN-GW 103 adds the measured amount of data to the amount of data confirmed at the time of call establishment.

Reception unit 106a1 of radio base station 106a receives the value of counter i from MME 105.

In the exemplary embodiment, reception unit 106a1 is given notice of the value of counter i by S1 message: INITIAL CONTEXT SETUP REQUEST (see message 205 in FIG. 3) or SAE BEARER SETUP REQUEST (see message 301 in FIG. 3), from MME 105.

It is also to possible use a method of determining the implementation of procedures as follows, in a previously set time zone, e.g., from evening to night, etc.

Allocation unit 106a2 checks whether the service requested by mobile terminal 107 is a GBR service or non-GBR service.

If the service requested by mobile terminal 107 is a non-GBR service, allocation unit 106a2 checks the uplink RB usage ratio and downlink RB usage ratio in the cell under control.

When the uplink RB usage ratio is less than the prescribed threshold α and the downlink RB usage ratio is less than the prescribed threshold β, allocation unit 106a2 will not use the value of counter i to allocate radio resources.

When the uplink RB usage ratio is equal to or greater than the prescribed threshold α or the downlink RB usage ratio is equal to or greater than the prescribed threshold β, allocation unit 106a2 performs allocation of radio resources to mobile terminal 107 using the value of counter i.

Allocation unit 106a2 has value $\gamma_i$ corresponding to the value on counter i.

Allocation unit 106a2 calculates first throughput information R and second throughput information X, and determines selection index M of mobile terminal 107, based on the following equation:

$$M = \frac{R}{X^{\gamma_i}}.$$ [Math 5]

As shown in Math 5, allocation unit 106a2 calculates selection index M for mobile terminal 107 by inflating the average throughput X of mobile terminal 107 based on the amount of data transmission/reception in the past.

Accordingly, the selection index M of a mobile terminal having a greater amount of data transmission/reception in the past becomes smaller. Allocation unit 106a2 allocates radio resources to mobile terminals having large selection indexes M among all selection indexes M. Accordingly, the radio resources to be allocated to mobile terminals having greater amounts of data transmission/reception in the past will be relatively reduced.

Next, operation at the time of a handover will be described.

At the time of a handover using X2 link, original radio base station 106a transmits the value of counter i to reception unit 106b1 in target mobile station 106b by X2 message HANDOVER REQUEST (see Step 402 in FIG. 5). Thereafter, allocation unit 106b2 in target radio base station 106 implements the operation shown in FIG. 10.

On the other hand, at the time of a handover using S1 link, MME 105 transmits the value on counter i to reception unit 106b1 inside target radio base station 1061Y by S1 message HANDOVER REQUEST (see Step 503 in FIG. 6). Thereafter, allocation unit 106b2 in target radio base station 106 implements the operation shown in FIG. 10.

Next, the operation at the time of updating the value on counter i will be described.

For each mobile terminal 107, PDN-GW 103 increases the value on counter i corresponding to mobile terminal 107 when the sum total of the amounts of uplink and downlink data exceeds a prescribed value.

PDN-GW 103 notifies MME 105 of the updated value of counter i.

MME 105 transmits the updated value of counter i to reception unit 106b1 in target radio base station 106b by SAE BEARER MODIFY REQUEST (see message 601 in FIG. 7). Thereafter, allocation unit 106b2 in target radio base station 106 implements the operation shown in FIG. 10, using the updated value of counter i.

In the present exemplary embodiment, in order to improve the fairness between mobile terminals and achieve effective frequency use, the radio base station performs radio resource allocation, taking into account the amounts of data having been transmitted/received by the mobile terminals up to a certain point of time and the cell condition in which the mobile terminals is present.

When there exist many mobile terminals in the cell, a mobile terminal that constantly transmits/receives large amounts of data, possesses radio resources and lowers the throughputs of the mobile terminals other than that. To deal with this, when radio resources are allocated, fairness between mobile terminals is secured by taking into consideration the amount of data having been transmitted/received up to that point of time.

However, if a high enough amount of radio resources can be used in a cell in which a mobile terminal transmitting/receiving a large amount of data is present, no unfairness will occur. This is because, even if the mobile terminal that transmits/receives a large amount of data stops communicating, the throughputs of other mobile terminals will not improve.

Next, the effect of the present exemplary embodiment will be described.

The first effect is to achieve both improvement in fairness between mobile terminals and effective frequency usage, in allocating radio resources in radio base stations 106a and 106b, by reducing the chance that radio resource will be allocated to a mobile terminal that transmits/receives a large amount of data only when the amount of radio resources used for uplink or downlink is high.

According to the second effect, it is possible for radio base stations 106a and 106b to control the chance of radio resource allocation to each mobile terminal in a stepwise manner, for example, by having the value $\gamma_i$ corresponding to the value of counter i. This feature is effective in improving fairness between mobile terminals.

According to the present exemplary embodiment, allocation units 106a2 and 106b2 control the radio resources to be allocated to mobile terminal 107, based on the value on counter i as the adjustment value when the previously designated operational conditions are satisfied. The value on counter i presents a value that corresponds to the amount of data transmitted/received within a predetermined period by mobile terminal 107.

Accordingly, it is possible to reduce the radio resources to be allocated to a mobile terminal that is transmitting/receiving a large amount of data. It is therefore possible to improve throughput fairness between mobile terminals.

In the present exemplary embodiment, when the adjustment value is adapted to become smaller as the amount of data is reduced, allocation units 106a2 and 106b2 increase the amount of radio resources to be allocated to the mobile terminal as the adjustment value becomes smaller.

In this case, it is possible to reduce allocation of radio resources to the mobile terminal that is transmitting/receiving a large amount of data. Accordingly, it is possible to improve throughput fairness between mobile terminals.

In the present exemplary embodiment, allocation units 106a2 and 106b2 control radio resources to be allocated to mobile terminal 107 based on first throughput information R and second throughput information X and the adjustment value.

In this case, it is possible to perform PF scheduling that is improved so as to reduce allocation of radio resources to the mobile terminal that is transmitting/receiving a large amount of data.

In the present exemplary embodiment, reception units 106a1 and 106b1 receive the adjustment value from EPC 101 or the original radio base station when mobile terminal 107 is accommodated.

In this case, it is possible to receive the adjustment value when the adjustment value is needed.

In the present exemplary embodiment, the operational conditions include a condition in which the usage ratio of radio resources is equal to or greater than a predetermined threshold.

In this case, it is possible to perform allocation of radio resources using the adjustment value when allocation of radio resources using the adjustment value is effective.

In the present exemplary embodiment, the operational conditions include a condition in which the service requested by mobile terminal 107 is a non-GBR service.

In this case, it is possible to perform allocation of radio resources using the adjustment value for services that are free from problems as to the guarantee of the transmission rate even if allocation of radio resources using the adjustment value is used.

In the above exemplary embodiment, the calculation formula which allocation units 106a2 and 106b2 use to calculate selection index M for mobile terminal 107 is not limited to the above but can be changed as appropriate. For example, allocation units 106a2 and 106b2 may use $M=R/(\gamma_i X)$ in order to calculate selection index M for mobile terminal 107.

As the present invention has been described heretofore by referring to each exemplary embodiment, the present invention should not be limited to each of the above exemplary embodiments. Various changes that will be understood by those skilled in the art can be added to the configurations and details of the present invention within the scope of the present invention.

DESCRIPTION OF REFERENCE NUMERALS

1 scheduling system
101 EPC
102 PCRF
103 PDN-GW
104 S-GW
105 MME
106a, 106b radio base station
106a1, 106b1 reception unit
106a2, 106b2 allocation unit
107 mobile terminal

The invention claimed is:

1. A radio base station that can communicate with a management device and that accommodates a plurality of mobile terminals, comprising:
   a receiver for receiving from the management device each adjustment value in conformity with each amount of data which each mobile terminal has transmitted and received within a predetermined period; and
   an allocator for controlling radio resources to be allocated to each mobile terminal, based on each adjustment value when predetermined operational conditions are satisfied,
   wherein the allocator calculates usage ratio of the radio resources,
   the operational conditions include a condition in which the usage ratio of the radio resources is equal to or greater than a previously determined threshold, and
   the usage ratio of the radio resources is a usage radio of resource blocks and not throughput,
   wherein each adjustment value is designated such that the lower the amount of data, the smaller is the adjustment value, and the allocator preferentially allocates the radio resources to each mobile terminal having a small adjustment value among all adjustment values.

2. A scheduling system comprising: a radio base station according to claim 1; a management device that stores an adjustment value in conformity with each amount of data which each mobile terminal accommodated by the radio base station has transmitted and received within a predetermined period.

3. An allocation control method implemented by a radio base station that can communicate with a management device and that accommodates a plurality of mobile terminals, the method comprising:
   receiving from the management device each adjustment value in conformity with each amount of data which each mobile terminal has transmitted and received within a predetermined period; and
   controlling radio resources to be allocated to each mobile terminal, based on each adjustment value when predetermined operational conditions are satisfied,
   wherein the controlling calculates usage ratio of the radio resources, the operational conditions include a condition in which the usage ratio of the radio resources is equal to or greater than a previously determined threshold, and the usage ratio of the radio resources is a usage radio of resource blocks and not throughput, wherein each adjustment value is designated such that the lower the amount of data, the smaller is the adjustment value, and controlling the radio resources comprises preferentially allocating the radio resources to each mobile terminal having a small adjustment value among all adjustment values.

4. An allocation control method implemented by a scheduling system including a management device, and a radio base station that can communicate with the management device, that accommodates a plurality of mobile terminals, wherein the management device implements storing each adjustment value in conformity with each amount of data which each mobile terminal has transmitted and received within a predetermined period, the radio base station implements receiving each adjustment value from the management device, and the radio base station implements controlling radio resources to be allocated to each mobile terminal, based on each adjustment value when predetermined operational conditions are satisfied, and calculates usage ratio of the radio resources, wherein the operational conditions include a condition in which the usage ratio of the radio resources is equal to or greater than a previously determined threshold, and the usage ratio of the radio resources is a usage radio of resource blocks and not throughput, wherein each adjustment value is designated such that the lower the amount of data, the smaller is the adjustment value, and the radio base station preferentially allocates the radio resources to each mobile terminal having a small adjustment value among all adjustment values.

* * * * *